United States Patent
Lambert

(10) Patent No.: US 9,796,392 B2
(45) Date of Patent: Oct. 24, 2017

(54) METHOD OF DETERMINING WHETHER A FRAME OF A WORK MACHINE IS APPROACHING A TIP OVER POINT

(71) Applicant: Caterpillar SARL, Geneva (CH)

(72) Inventor: Adam J. Lambert, Durham (GB)

(73) Assignee: Caterpillar SARL, Geneva (CH)

(*) Notice: Subject to any disclaimer, the term of this patent is extended or adjusted under 35 U.S.C. 154(b) by 0 days.

(21) Appl. No.: 15/120,008

(22) PCT Filed: Jan. 13, 2015

(86) PCT No.: PCT/EP2015/050509
§ 371 (c)(1),
(2) Date: Aug. 18, 2016

(87) PCT Pub. No.: WO2015/124329
PCT Pub. Date: Aug. 27, 2015

(65) Prior Publication Data
US 2017/0050643 A1     Feb. 23, 2017

(30) Foreign Application Priority Data
Feb. 18, 2014   (GB) .................................. 1402837.7

(51) Int. Cl.
*B60W 40/10*     (2012.01)
*B60P 1/04*      (2006.01)
*B60G 5/02*      (2006.01)

(52) U.S. Cl.
CPC .............. *B60W 40/10* (2013.01); *B60G 5/02* (2013.01); *B60P 1/045* (2013.01);
(Continued)

(58) Field of Classification Search
CPC ...... B60T 2230/03; B60T 8/18; B60W 30/02; B60W 2530/10; B60W 40/13; B60W 40/10
See application file for complete search history.

(56) References Cited

U.S. PATENT DOCUMENTS 4,218,672 A    8/1980  Weisshappel et al.
5,032,821 A    7/1991  Domanico et al.
(Continued)

FOREIGN PATENT DOCUMENTS

EP       0684150 A1      11/1995
GB       2385452 A       8/2003
WO       WO 84/03262 A1  8/1984

OTHER PUBLICATIONS

United Kingdom Intellectual Property Office, Search Report in United Kingdom Patent Application No. GB1402837.7, Aug. 22, 2014, 2 pp.
(Continued)

*Primary Examiner* — Curtis Odom

(57) ABSTRACT

The present disclosure relates to a method of determining whether a frame of a work machine is approaching a tip over point. First and second loads upon respective first and second support arrangements of the frame are detected using respective first and second sensing means. Signals are generated indicative of the first and second loads and communicated to a controller. The controller is configured to generate an alert based upon the first and second loads when the first and/or second load signals indicate that the orientation of the work machine is approaching a tip over point.

8 Claims, 2 Drawing Sheets

(52) U.S. Cl.
CPC .. *B60G 2204/1162* (2013.01); *B60G 2300/06* (2013.01); *B60G 2300/09* (2013.01); *B60G 2400/63* (2013.01); *B60G 2401/12* (2013.01); *B60G 2600/02* (2013.01); *B60G 2600/044* (2013.01); *B60G 2800/0124* (2013.01); *B60W 2300/12* (2013.01); *B60W 2300/17* (2013.01); *B60W 2422/10* (2013.01)

(56) References Cited

U.S. PATENT DOCUMENTS

| | | | |
|---|---|---|---|
| 5,742,228 A | 4/1998 | Levy | |
| 5,825,284 A | 10/1998 | Dunwoody et al. | |
| 6,262,658 B1 | 7/2001 | O'Connor | |
| 6,452,487 B1 * | 9/2002 | Krupinski | B60R 21/013 180/290 |
| 2012/0083947 A1 * | 4/2012 | Anderson | B60W 30/09 701/3 |
| 2012/0209502 A1 | 8/2012 | Nichols et al. | |
| 2012/0239257 A1 | 9/2012 | Ichinose et al. | |

OTHER PUBLICATIONS

European Patent Office, International Search Report in International Patent Application No. PCT/EP2015/050509, Jun. 1, 2015, 3 pp.

\* cited by examiner

METHOD OF DETERMINING WHETHER A FRAME OF A WORK MACHINE IS APPROACHING A TIP OVER POINT

CROSS-REFERENCE TO RELATED APPLICATIONS

This application is a national phase application of International Patent Application No. PCT/EP2015/050509, filed Jan. 13, 2015, which claims priority to European Patent Application No. GB 1402837.7, filed Feb. 18, 2014, both of which are incorporated by reference herein in their entireties for all purposes.

TECHNICAL FIELD

This disclosure is directed towards a method of determining whether the frame of a work machine is approaching a tip over point and an apparatus suitable for performing such a method.

BACKGROUND

Work machines, such as cranes, articulated work machines, backhoe loaders and the like, are commonly employed on uneven terrain, for example during construction and excavation. When on uneven terrain the work machine may be positioned at an unsafe roll angle, which may cause the work machine to tip over.

Articulated work machines, including articulated trucks with tipping bodies, articulated trucks with ejector mechanisms, articulated wheel loaders and the like, typically comprise a first frame (such as a tractor) and a second frame (such as a trailer) connected to one another via an articulation joint. The articulation joint enables the frames to roll relative to one another. As a result, on uneven terrain one of the frames may be positioned at an unsafe roll angle such that one of the frames or the entire machine may tip over. Furthermore, since the roll angle of one frame is independent of the other frame, the operator may be unaware of the roll angle of the frame in which they are not located. The operator may, therefore, be unaware that part of the articulated vehicle is at an unsafe roll angle or may even have already tipped over.

Articulated work machines may also comprise a member such as a body for holding material which can be tipped about a pivot point to empty any material held therein. When the body is tipped, the centre of gravity of the frame to which the body is attached may be raised further from the terrain. As a result, the threshold value of the roll angle at which the frame tips over may change, and the frame may be more prone to tipping over.

One method of preventing tip over of an articulated work machine is to measure the angle of the frames and provide a warning to the operator when the roll angles of the frames are approaching unsafe threshold values, above which the vehicle will tip over. U.S. Pat. No. 5,825,284 and U.S. Pat. No. 5,742,228 disclose systems suitable for such a method. However, such a method only provides an indication of the position of the frames and/or machine and has been found to provide insufficient warning that a tip over is imminent.

SUMMARY

The present disclosure provides a method of determining whether a frame of a work machine is approaching a tip over point, the frame comprising first and second support arrangements each supporting a portion of the load of the frame on a surface, the method comprising the steps of: detecting a first load upon the first support arrangement using first sensing means and detecting a second load upon the second support arrangement using second sensing means; generating signals indicative of the first and second loads; communicating the signals to a controller; and wherein the controller is configured to generate an alert based upon the first and second loads when the first and/or second load signals indicate that the orientation of the work machine is approaching a tip over point.

This disclosure further provides an apparatus for performing the method and a work machine comprising such apparatus.

By way of example only, embodiments of the method of determining whether a frame of a work machine is approaching a tip over point, apparatus suitable for performing such a method and a work machine comprising such an apparatus are now described with reference to, and as show in, the accompanying drawings.

DETAILED DESCRIPTION

This disclosure is directed towards a method of determining whether the frame of a work machine is approaching a tip over point. This disclosure is further directed towards apparatus suitable for performing such a method and a work machine comprising such apparatus. The method and apparatus utilises first and second load sensing means, which are attached to first and second support arrangements, which are attached to parts of the work machine and are suitable for supporting a portion of the load of the work machine on a surface. The first and second load sensing means detect the portion of the total load of the work machine on each of the first and second support arrangements. A controller is arranged to receive signals from the first and second load sensing means and generate an alert if the work machine is approaching a point at which it will tip over.

The apparatus and method are suitable for use with a variety of work machines. Suitable work machines include cranes, road and/or off-road vehicles, articulated work machines, articulated trucks, articulated vehicles, pavers, backhoe loaders, cold planers, track or wheel loaders, dozers, draglines, drills, front shovels, excavators, fellers, harvesters, knuckleboom loaders, material handlers, pipelayers and scrapers. However, the apparatus and method are particularly suited to articulated trucks.

Figure 1:
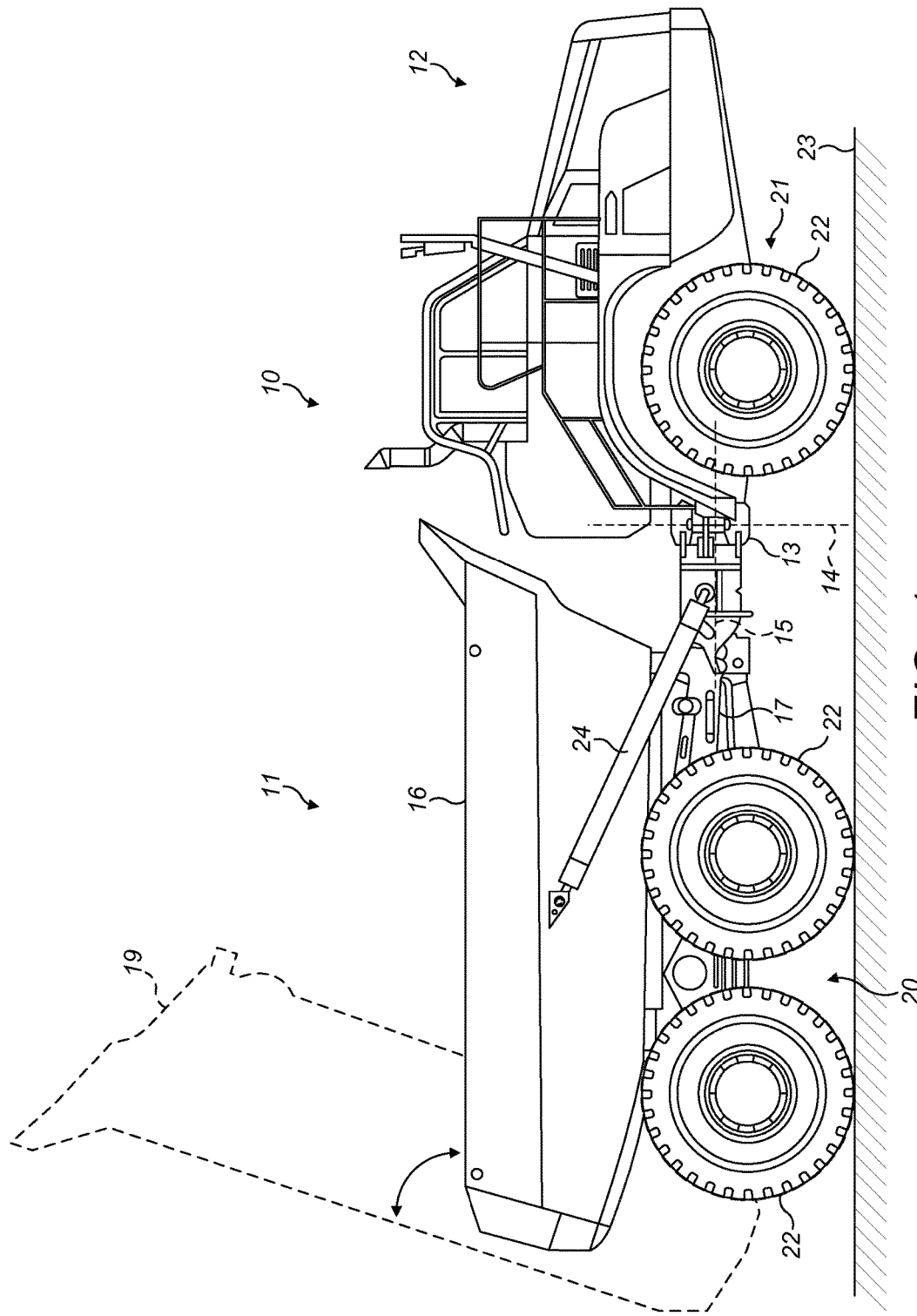
FIG. 1 is a side elevation of an articulated work machine of the present disclosure.

FIG. 1 illustrates an embodiment of an articulated work machine 10 of the present disclosure in the form of an articulated tipper truck. The articulated work machine 10 may comprise a first frame 11, in this example a trailer unit, attached to a second frame 12, in this example a tractor unit. The frames 11, 12 may be attached together by a coupling 13. The tractor unit may house the operator controls for the work machine 10.

The coupling 13, which may be an articulation joint, may allow each of the first and second frames 11, 12 to be orientated at a different yaw and/or roll angle to the other frame 12, 11. The articulated work machine 10 may be steered by adjusting the yaw angle of the first and second frames 11, 12 about an axis of articulation 14 utilising actuators, for example hydraulic cylinders, suitably attached to each of the first and second frames 11, 12 on either side of the coupling 13. The roll angle of the first frame 11 may be different to the roll angle of the second frame 12 about a roll axis 15. The coupling 13 may allow the first and second frames 11, 12 to freely rotate about the roll axis 15 relative to one another.

The first frame 11 may comprise a payload carrier 16, such as a dump body adapted to carry a load which is pivotally attached to a chassis 17 of the first frame 11 at a pivot point. The first frame 11 may comprise a tipping system 18 which, when activated, causes the payload carrier 16 to rotate about the pivot from a "body down" position into a "body up" tipping position 19. The tipping system 18 may be any suitable system, such as, for example, a hydraulic, electric or mechanical system. As the tipping system 18 rotates the payload carrier 16 to the tipping position 19, the payload carrier 16 ejects any materials or load from the payload carrier 16. The payload carrier 16 may be any type of container and may be open at the top, fully enclosed or partially enclosed.

In order for the load or materials to be ejected from the payload carrier 16 it may be designed not to move relative to the chassis 17, but may instead utilise an ejector mechanism. Ejector mechanisms are well known in the art, and typically comprise an ejector plate which slides horizontally from one end of the inside of the payload carrier 16 towards the other end (the ejection end) to push any load or materials out of the payload carrier 16. A hydraulic actuator or the like may be used to move the ejector plate towards the ejection end of the payload carrier 16.

The articulated work machine 10 comprises first and second support arrangements 20, which may be attached to the chassis 17 on either side of the work machine 10. Third and fourth support arrangements 21 may be attached to either side of the second frame 12. The first, second, third and fourth support arrangements 20, 21 may each support a portion of the total load or weight of the work machine 10 on a terrain 23. The first and second support arrangements 20 may be attached to either side of the chassis 17 of the first frame 11 and each support a portion of the load, referred to as first and second loads respectively, of the first frame 11 (i.e. the weight resulting from at least the chassis 17 and the payload carrier 16). The first, second, third and fourth support arrangements 20, 21 may each comprise one or more terrain engaging means 22 in contact with the terrain 23. The terrain 23 may be the ground or any surface on which the articulated work machine 10 is operable. The terrain engaging means 22 may be, for example, tracks and/or wheels which enable the machine 10 to move along the terrain 23 and the articulated work machine 10 may comprise any number of terrain engaging means 22. As illustrated, the first and second support arrangements 20 may have two terrain engaging means 22 each and the third and fourth support arrangements 21 may have one terrain engaging means 22 each.

The work machine 10 may further comprise driving means (not shown) for driving at least one of the terrain engaging means 22 to move the articulated work machine 10 along the terrain 23. The driving means may comprise at least one rotatable shaft and/or axle operably connected to the at least one terrain engaging means 22. The rotatable shaft and/or axle may be operably connected to and driven by a power unit of any suitable type, such as an internal combustion engine, a micro-turbine or an electric motor. In one embodiment, the power unit is situated in/on one of the first and second frames 11, 12 and the coupling 13 transfers power from the power unit to terrain engaging means 22 attached to the other frame 12, 11. Therefore, the terrain engaging means 22 is/are operably connected to, i.e. receives power from, the power unit. In a further embodiment, all of the terrain engaging means 22 of the articulated work machine 10 are operably connected to the power unit.

Figure 2:
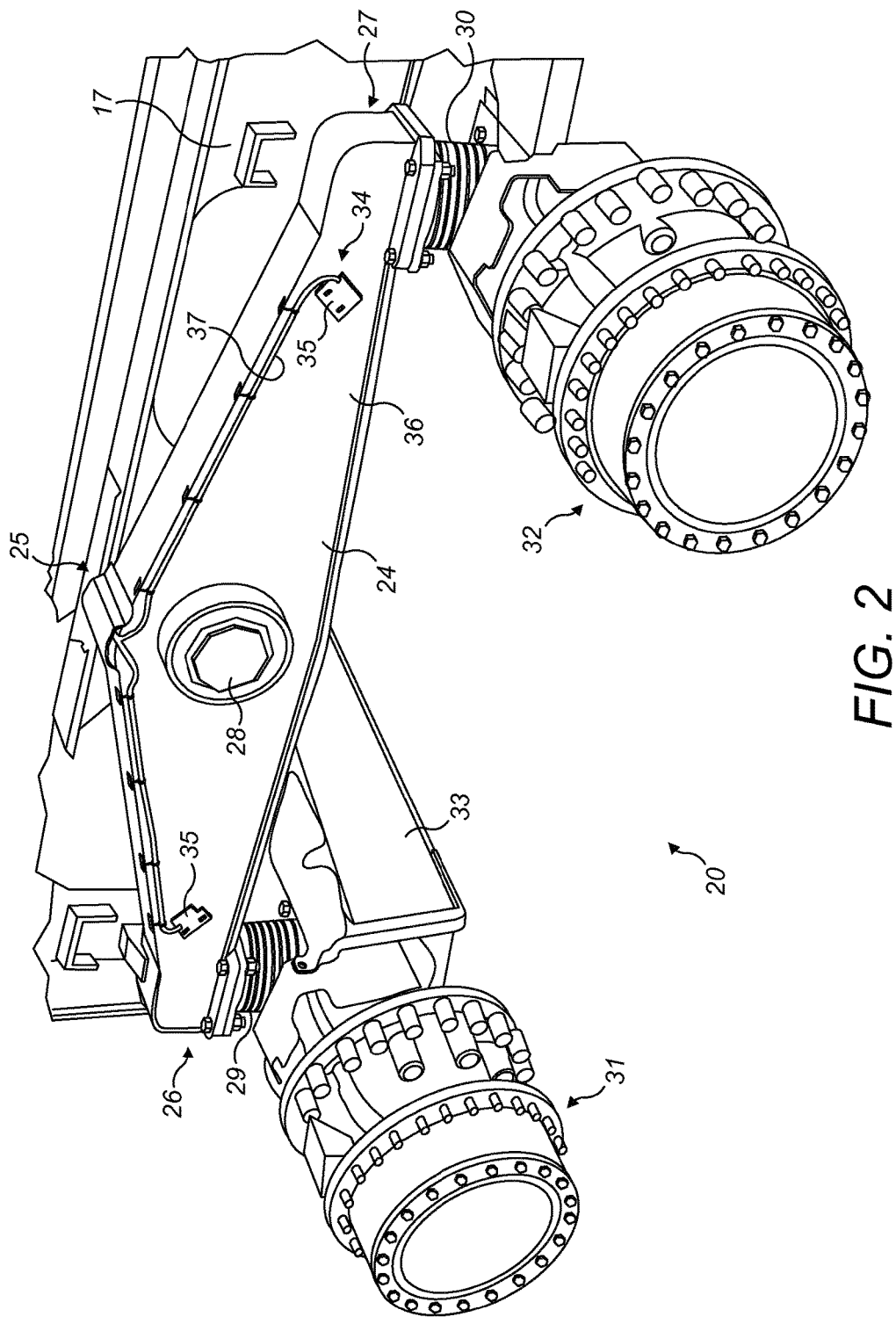
FIG. 2 is a perspective view of a section of a support arrangement of the articulated work machine of FIG. 1.

Further details of the first support arrangement 20 are illustrated in FIG. 2 with the terrain engaging means 22 omitted for clarity. The first support arrangement 20 may comprise a walking beam 24. The walking beam 24 is connected to two terrain engaging means 22 and is arranged such that when one terrain engaging means 22 moves upwards the other terrain engaging means 22 moves downwards and vice-versa. The walking beam 24 may have a substantially triangular shape with an apex 25 and first and second ends 26, 27. The walking beam 24 may be rotatably attached to the chassis 17 at a pivot point 28 located substantially adjacent to the apex 25.

The first and second ends 26, 27 may each be attached by a first and a second suspension arrangement 29, 30 to axles (not shown) driven by the driving means. The first and second suspension arrangements 29, 30 may comprise springs, although other suitable arrangements may be provided, such as pneumatic and/or hydraulic suspension arrangements. The first and second suspension arrangements 29, 30 may alternatively comprise solid suspension mounts such as rubber blocks. First and second hubs 31, 32 may be attached to the axles, upon which the terrain engaging means 22 may be mounted. Each of the axles may be moveably attached to the chassis via one or more A-frames 33, as is known in the art.

A first sensing means 34 may be attached to the walking beam 24 and is arranged to detect the load upon the walking beam 24. This is the "first load", i.e. the portion of the total load of the work machine 10/first frame 11 supported by the first support arrangement 20. The first sensing means 34 is configured to generate at least one signal indicative of the first load, which may be indicative of the shear forces acting on the walking beam 24.

The first sensing means 34 may comprise a plurality of sensors 35 attached to the walking beam 24, each being operable to generate a signal indicative of at least a portion of the first load. The first load may be determined by aggregating the outputs from each sensor 35. Each sensor 35 may be arranged on the walking beam 24 at a region of a maximum magnitude of shear strain/force acting on the walking beam 24 due to the load of the payload carrier 16. Suitable types of sensors 35 include strain gauges. In particular, each sensor 35 may be angularly orientated along the direction of the shear forces acting on the walking beam 24. A sensor 35 may be attached to each of an outer surface 36 and an inner surface (not shown) of the walking beam 24 substantially adjacent to either side of each of the first and second ends 26, 27. Thus four sensors 35 may be attached to the walking beam 24. Such an arrangement may allow the maintenance of higher accuracy whilst determining the magnitude of the shear forces. Furthermore, the use of more than one sensor 35 may reduce the noise in the first signal relative to arrangements employing just one sensor 35.

The second support arrangement may comprise the same components as the first support arrangement 20. Second sensing means (not shown) are attached to the walking beam of the second support arrangement in a similar manner to the first sensing means 34. The second sensing means may be arranged to detect the load upon the walking beam, which would be the "second load", and may be operable to generate at least one signal indicative of the second load and more particularly indicative of the shear forces acting on the walking beam 24. Therefore, the aforementioned features of the first support arrangement 20 and first sensing means 34 equally apply to the second support arrangement and second sensing means.

The first and second sensing means 34 may comprise other arrangements of one or more sensors. For example, a single sensor may be located adjacent to the apex of the walking beam 24 and may generate signals indicative of the first load. Alternatively, one or more load cells may be attached to or located within each of the first and second suspension arrangements 29, 30. The load cells may be attached at the joints between the first and second suspension arrangements 29, 30 and the walking beam 24 or axles. In further alternatives, the sensors may be attached to the axles, first and second hubs 31, 32 and/or the terrain engaging means 22.

The first and second sensing means 34 are arranged to communicate with a controller, for example via a wiring arrangement 37 connecting each sensor 35 to the controller or via a wireless connection. The controller and/or first and second sensing means 34 may receive power from a power supply. One or more displays devices and/or one or more input devices may also be connected to the controller and/or first and second sensing means 34. The controller may further be connected to the power unit and/or a power unit controller such that the controller can automatically control the speed of movement of the work machine 10.

INDUSTRIAL APPLICABILITY

Operation of the system (method and apparatus) of the present disclosure will now be described in more detail. The controller receives at least one signal from the first and/or second sensing means 34 which is indicative of the first and/or second loads. In a total load measurement mode, the controller may aggregate signals received from the first and second sensing means 34 to calculate the total load or weight of the first frame 11/work machine 10, including the weight of any payload, supported by the first and second support arrangements 20.

The controller is arranged to generate an alert based upon the at least one signal under predetermined conditions. The alert generated by the controller indicates that the orientation of the first frame 11 or work machine 10 is approaching the point at which it will tip over. The tip over point may be when the roll angle of the first frame 11 is such that the centre of gravity of the first frame 11 substantially overlies the first or second support arrangement 20. If the roll angle is increased, the first frame 11 may tip over onto its side or top such that it is no longer in its normal upright position. At the tip over point the total load of the first frame 11 is supported on only one of the first and second support arrangements 20 (i.e. one of the first and second loads is zero and the other is equal to the total load of the first frame 11).

The controller generates the alert from the at least one signal using one or more different modes of operation. In a first mode of operation, the controller may determine from the signal(s) received from the first and second sensing means 34 whether the first and/or second loads have reached one or more threshold values. The alert may then be generated to warn that one or more threshold values are reached. The threshold value(s) may be stored within the controller memory and may comprise a maximum threshold value and a minimum threshold value. The minimum and maximum threshold values may be representative of the minimum and maximum loads respectively that are applied to each one of the first and second support arrangements 20 at the tip over point.

In one example, the load detected by the first sensing means 34 on the first support arrangement 20 may reach a maximum threshold value of 85% of the total load and the load detected by the second sensing means on the second support arrangement may reach a minimum threshold value of 15% of the total load. An alert may be generated to indicate to the operator that the first frame 11 and/or work machine 10 is approaching the tip over point, which would occur when 100% of the total load was supported on just one of the first and second support arrangements 20. Further alerts may be generated at further threshold values, such as 90%, 95% and 100% of the total load. In an alternative example, the controller may generate an alert when only one of the loads detected by one of the first and second sensing means 34 reaches the maximum threshold value.

In a second mode of operation, the controller may receive from the first and second sensing means 34 a plurality of signals over a time period. The controller may subsequently determine from these signals a change in at least one of the first and second loads over the time period. The controller may then determine, based upon the change, whether a threshold value has be reached and, if reached, generate an alert. The threshold value may be the maximum magnitude of load that can shift from the first support arrangement 20 to the second support arrangement and vice-versa without the first frame 11 or work machine 10 reaching the tip over point.

Alternatively, or in addition, the threshold value may be based upon the change in position of the centre of the load of the first frame 11 or work machine 10. The controller may initially define a balanced load centre position at substantially equal first and second loads. In such a state the load centre is midway between the first and second support arrangements 20. The controller may then calculate a new load centre position upon detecting a change in at least one of the first and second loads. For example, if the first load increases, the load centre position will move towards the first support arrangement by an amount proportional to the increase in the first load. The threshold value may be based upon the magnitude of the displacement of the new load centre from the balanced load centre. For example, the threshold value may be a displacement of 40% of the distance between the first and second support arrangements. Further threshold values may also be used, such as 45% and 50%.

In a third mode of operation, the controller may determine the velocity of the movement of the load between the first and second support arrangements 20. The velocity may be based upon the magnitude of a change in at least one of the first and second loads over a time period and the length of that time period. The controller may then determine whether the load velocity has reached a threshold value and, if reached, generate the alert. The threshold value may be the maximum velocity at which the load can shift from the first support arrangement 20 to the second support arrangement and vice-versa without the first frame 11 or work machine 10 reaching the tip over point.

The controller may determine the velocity by initially defining a balanced load centre position at a predetermined first and second load. The controller may then calculate a new load centre position upon detecting a change in at least one of the first and second loads. Subsequently, the controller calculates the velocity as the movement of the load centre from the balanced load centre position to the new load centre position.

In a fourth mode of operation the controller may calculate the momentum of the load as it moves at a velocity determined as described in respect of the third mode of operation. The controller may determine the magnitude of the change in the first and second load and use the change in the mass of the load to calculate the momentum of the load. The controller may then determine whether the momentum has reached a threshold value. The threshold value may represent the maximum momentum of the load possible without the work machine 10 tipping over. If the threshold vale is reached, the controller may generate an alert.

In a fifth mode of operation the controller may receive a plurality of signals from the first and second sensing means 34 over a plurality of time periods. The controller may subsequently determine from the signals a rate of change at least one of the first and second loads over the plurality of time periods. The controller may then determine whether the rate of change has reached a threshold value and, if reached, generate an alert. The threshold value may be representative of the maximum rate at which load can move from the first support arrangement 20 to the second support arrangement and vice-versa before the first frame 11 or work machine 10 will reach the tip over point.

The first and second sensing means 34 may be configured to generate, and the controller may be configured to receive, the signals many times per second, i.e. at a sample rate. A suitable sample rate is at least 10 Hz. The sample rate is selected to ensure that very quick movements of the load can be detected whilst bearing in mind the processing power and memory of the controller available for sampling the received data.

The controller may be configured to redefine each of the one or more signals as the root mean square value of a predetermined number of previously received first or second signals. For example, when the controller receives a signal, it may redefine that signal as the root mean square value of the ten previously received signals. The significant benefit of this operation is that noise and minor variations are reduced.

As mentioned previously, the controller may generate an alert based upon any one of the five modes of operation. Each mode may be run simultaneously and if a threshold value is reached in any of the modes of operation the alert is generated. Each mode may comprise a plurality of sequential threshold values and when each threshold value is reached an alert may be generated. For example, a first alert may be generated as an initial warning that the tip over point is being approached and a second alert may be generated as a critical warning when tip over point is very close or closer than when the first alert was generated.

In alternative embodiments, the controller may switch off certain modes of operation if predetermined conditions are met. The implementation of the second to fifth modes of operation may depend upon the total load detected by the first and second sensing means 34, as if the total load is not sufficiently high then any change in the load between the first and second support arrangements 20 may not be likely to cause tip over. Alternatively, the controller may implement the different modes based upon the work machine 10 speed and its activity. Such activities may include loading, tipping, travelling and/or cornering.

The controller may generate an alert based only upon the received signals indicative of the first and second loads (i.e. independently of whether the roll angle is being detected or, if so, independently of the detected roll angle). A benefit of such an arrangement may be that during tip over the payload of the work machine 10 generally moves before the work machine 10 rolls when the work machine 10 is on an uneven surface. Therefore, the load change may be detected as per any one of the mode of operations. A change in load may thus indicate that the work machine 10 is about to roll and, as a result, tip over may be predicted. A prediction is preferable to the output of a roll angle sensor, which only indicates the current roll angle.

The alert may be displayed on the display device, which may for example be a buzzer or indicator light, to an operator such that the operator can take action to prevent the work machine 10 from tipping over. Alternatively or in addition, the controller may send signals to the steering arrangement to automatically control the direction of steering of the work machine 10 to prevent tip over. Alternatively or in addition, the controller may send signals to the power unit and/or power unit controller to automatically adjust the speed of movement of the work machine 10 to prevent tip over.

The invention claimed is:

1. A method of determining whether a frame of a work machine is approaching a tip over point, the frame comprising first and second support arrangements each supporting a portion of the load of the frame on a surface, the method comprising the steps of:

detecting a first load upon the first support arrangement using first sensing means and detecting a second load upon the second support arrangement using second sensing means;

generating signals indicative of the first and second loads;

communicating the signals to a controller; and wherein the controller is configured to:

generate an alert based upon the first and second loads when the first and/or second load signals indicate that the orientation of the work machine is approaching a tip over point;

receive a plurality of signals over a time period from the first and second load sensing means;

determine from the plurality of signals a change in at least one of the first and second loads over the time period;

determine, based upon the change, whether a threshold value has been reached and, if reached, generate the alert;

determine, based upon the change, whether the threshold value has been reached by: defining a balanced load center position at substantially equal first and second loads; determining a new load center position upon detecting the change in at least one of the first and second loads over the time period; determining, based upon the change in position between the balanced load center position and the new load center position, whether the threshold value, indicating that the orientation of the work machine is approaching a tip over point, has been reached;

define the threshold value as a maximum displacement of the new load center from the balanced load center; and calculate the velocity of the movement of the load based upon the velocity of the movement for the load center from the balanced load center position to the new load center position.

2. A method as claimed in claim 1 wherein the controller determines whether at least one of the first and second loads have reached one or more threshold values and generates the alert if one or more threshold values have been reached.

3. A method as claimed in claim 1 wherein the controller is configured to:
   receive a plurality of signals over a time period from the first and second load sensing means;
   determine from the plurality of signals a change in at least one of the first and second loads over the time period;
   calculate the velocity of the movement of the load between the first and second support arrangements; and
   generate the alert if the velocity has reached a threshold value.

4. A work machine comprising a frame, the frame comprising:
   first and second support arrangements, each for supporting a portion of the load of the frame on a surface, the first and the second support arrangements each including a walking beam operably connected to the frame and at least one terrain engaging means operably connected to the walking beam; and
   an apparatus for performing the method of claim 1, the apparatus comprising:
      first load sensing means for attachment to the first support arrangement for generating a signal indicative of a first load;
      second load sensing means for attachment to the second support arrangement for generating a signal indicative of a second load upon the second support arrangement; and
      the controller is configured to receive signals from the first and the second load sensing means and generate the alert,
   wherein one of the first or the second load sensing means are attached to the walking beam,
   wherein the first or the second load sensing means are arranged to detect the shear forces acting on the walking beam, and
   wherein the load sensing means comprises at least four sensors, each positioned substantially at a region of a maximum magnitude of shear force acting on the walking beam.

5. A method of determining whether a frame of a work machine is approaching a tip over point, the frame comprising first and second support arrangements each supporting a portion of the load of the frame on a surface, the method comprising the steps of:
   detecting a first load upon the first support arrangement using a first sensing means and detecting a second load upon the second support arrangement using a second sensing means;
   generating signals indicative of the first and the second loads; and
   communicating the signals to a controller;
      wherein the controller is configured to:
         generate an alert based upon the first and second loads when the first and/or second load signals indicate that an orientation of the work machine is approaching the tip over point;
         receive a plurality of signals over a time period from the first and second load sensing means;
         determine from the plurality of signals a change in at least one of the first and second loads over the time period;
         determine the magnitude of the change in at least one of the first and second loads;
         calculate the velocity of the movement of the load between the first and second support arrangements;
         calculate the momentum of the load based upon the velocity and magnitude of the change; and
         generate the alert if the momentum has reached a threshold value.

6. A method as claimed in claim 5 wherein the controller is configured to:
   receive a plurality of signals over a time period from the first and second load sensing means;
   determine from the plurality of signals a rate of change in at least one of the first and second loads over the time period; and
   generate the alert if the rate of change has reached a threshold value.

7. A method as claimed in claim 5 wherein the controller is configured to redefine the value of each signal as the root mean square of the values of a predetermined number of previously received signals.

8. A method as claimed in claim 5 wherein the controller is configure to generate the alert based upon the first and second loads and not upon a detected roll angle.

* * * * *